May 23, 1967     J. H. WALLY, JR     3,320,854
OPTICAL APPARATUS Filed May 4, 1965     4 Sheets-Sheet 1

INVENTOR
JOSEPH H. WALLY JR.
BY Brown, Jackson,
Boettcher & Dienner
ATTORNEYS

INVENTOR
JOSEPH H. WALLY JR.
BY Brown, Jackson,
Boettcher & Dienner
ATTORNEYS

May 23, 1967    J. H. WALLY, JR    3,320,854
OPTICAL APPARATUS

Filed May 4, 1965    4 Sheets-Sheet 4

INVENTOR
JOSEPH H. WALLY JR.
BY Brown, Jackson,
Boettcher & Dienner
ATTORNEYS

3,320,854
OPTICAL APPARATUS
Joseph H. Wally, Jr., Shawnee Mission, Kans., assignor to Opti-Copy, Inc., Kansas City, Mo., a corporation of Missouri
Filed May 4, 1965, Ser. No. 453,169
17 Claims. (Cl. 88—24)

This invention relates to means and method of utilizing microfilm for recording various documents and like papers.

Although not limited thereto, the invention has particular application to the retail drugs dispensing industry, where it is important that the druggist keep a record of each Rx prescription which he fills for his customers. These records should not only be permanent, but also must be readily accessible, as for example for refill on the doctor's order. At the same time, in such establishments storage space is usually at a premium, and wherefor such records should take up as little storage space as possible.

In line therewith, the invention contemplates making a permanent record of each Rx prescription filled by the druggist on either 8 mm. film or 16 mm. film. This can be conveniently accomplished by using a microfilm camera having a gate covered slit-type aperture in its flat top across which each prescription is passed to permit exposure of an image thereof on roll film located in the base of the camera. Such a camera will include both the necessary optics and a shutter or light source which is initiated by movement of the prescription paper face-down across the exposure slit. The paper, for example, trips a switch which operates the shutter or energizes the light as the paper is fed beneath the gate covering the exposure slot. As each prescription paper passes beyond the gate, it drops into a pile which at the end of the day or other time interval can be collected for disposal and/or storage. Storage of these originals can be at a remote station, because under other than exceptional circumstances they will not be referred to again. If 16 mm. film is used, preferably only one half its width is exposed at a time; the film being reversed and run lengthwith through the camera a second time to expose the other half of the film width. After developing, if 16 mm. film is used, the exposed film strip is split lengthwise, and, in either case, the exposed film is cut into strips several images long and one image wide. These strips are then loaded into what is hereinafter referred to as a "film jacket." Such jackets comprise two pieces of acetate or other clear transparent plastic joined along three sides and divided by narrow separators into parallel rows or channels having an entrance into the fourth side of the jacket which is left open to permit loading of a film strip into each said channels. Preferably the 8 mm. wide strips are cut into lengths, each containing 10 film images and the jackets are provided with 10 channels, plus a top margin for identification purposes. In this manner it is possible to mount 100 Rx prescriptions in 10 parallel rows or tiers of 10 images each, in a film jacket of a size roughly 4½″ x 4½″ which is hardly larger than the conventional file card, and need be essentially no thicker than such a card.

The present invention particularly includes a novel construction of rear projection viewing apparatus in which said film jackets can be conveniently mounted for near instantaneous scanning and which also provides an enlarged image of each prescription for viewing by the druggist and/or his customer.

In accordance with the invention, such a rear projection viewer is provided with a horizontally disposed stage on which is slidably supported a holder for the film jackets. It is a feature of the invention that the holder can be loaded by simply laying the film jacket broadside and flat thereon and with assurance that the jacket will be restrained against lateral displacement. At the same line the holder is adapted for manual actuated rectilinear movement across the stage in two normally relate directions of movement, one of which permits the operator to select the row of prescription images to be aligned between the objective, which is located above the stage, and the condenser lenses which are located below the stage. The other direction of motion facilitates the operator's scanning of each of the images in the selected row on the projector's viewing screen as said row is passed beneath the objective.

In connection with the above an advantage and/or feature of the invention is the provision of a film jacket holder which permits convenient near instantaneous loading of the film jackets therein and without the necessity to thread film through a gate or to locate it beneath a weighted cover.

Another feature of the invention is the provision of a film jacket holder which accommodates scanning of the images in each row of the film jacket to permit focusing an enlarged image of any one of the prescription images mounted in the jacket and while being sure that each frame of the film containing a prescription image is also square with respect to the periphery of the viewing screen, so that the full enlargement thereof may be visible.

In accordance with the invention, these objects are attained by providing a first slide comprising a frame having a transparent bottom wall on which the film jacket is rested, said transparent wall being rectangular shape corresponding to the shape of the film jacket, and the frame having stop means which engage on all four sides of the jacket to restrict the same against lateral movement relative to said transparent wall. This first slide member is mounted on a second slide member confined for sliding movement on the stage in a forward and reverse direction relative to the operator's position in front of the projector. The bottom wall of said second slide is therefore flat and includes a slot or light transmitting area which is aligned with the objective and condenser lenses, extending in the direction of the movement of said slide so that the slot is never out of alignment with the objective and condenser lenses. Light can therefore always pass through an illuminate that portion of the film jacket resting on the transparent wall of the first slide and aligned with the condenser lenses and light source. The first slide having the transparent wall and mounted on the flat bottom wall of the second slide is confined by the front and rear side walls of the second slide so that it can move only at right angles to the length or extent of the mentioned slot, thereby achieving the necessary compound movement for permitting selective illumination of each frame contained in the film jacket. Preferably index means are also provided which include a scale on the stage extending lengthwise of the movement of the second slide and the indicia of which align with an indicator on said second slide so as to indicate to the operator the row of prescription images in the jacket which is aligned with the objective for scanning, as by moving the first slide or film jacket supporting frame. This represents a further and important feature of the invention.

Advantageously, the film should be as close as practical to the adjacent surface of the condenser lens means for maximum illumination, and in accordance with the present invention this is achieved by locating the top surface of the condenser lens assembly substantially at the plane of the stage surface on which the second slide of the ilm jacket holder moves. This is a further feature of the nvention.

It is also important not only that the lenses of the objective be spaced at the proper distance from the film o obtain adequate focusing of an enlarged image of the ilm frames on the viewing screen, but it is equally important that the film frame containing the selected prescription for viewing be held in a plane essentially normal o the optical axis of the objective. Even slight errors and/or variations in said spacing or flatness of the film will result in the projected image being out of focus and therefore not easily read on the viewing screen. The film strips being formed of a relatively thin flexible material do not by themselves lay flat and tend to return to the roll form in which they are initially supplied by the manufacturer. When sandwiched between the secured sheets of acetate or other transparent plastic material constituting the film jackets they are more easily maintained in an essentially flat state; however, even so, there is considerable tendency for buckling and warping. The film strip loaded jackets can, of course, be held flat by covering them with a rigid glass plate. The thickness of the glass, however, tends to reduced the amount of transmitted light. The plate also is a collector of dust and its use complicates the loading and unloading of the film jacket as well as increasing the time and attention required for these operations. The plate is also an element which has to be handled and is therefore subject to frequent smudging.

A feature of the present invention is the novel means utilized by which these disadvantages of prior art projectors are overcome. In accordance with the invention the objective is mounted on one end of an arm pivotally connected to the rear wall of the housing so that it may be raised away from the film jacket to permit loading and unloading of the film jacket in its provided holder. This arm is also provided with a foot or the like located substantially at the periphery of the objective and adapted to engage the film jacket immediately below the objective but outside the area thereof illuminated by the beam from the condenser lenses. However, by reason of the proximity of said engagement to the portion of the film being illuminated and which contains the image desired to be enlarged, said portion of the film is thereby held flat against the transparent bottom wall of the holder and also at the proper distance from the objective so that good focus is assured and automatically obtained of each frame of the film as it is aligned beneath the objective for viewing an enlargement on the viewing screen. Even a buckled and/or damaged jacket can be retained in reasonably good focus by such means.

Usefully, the foot will be felt covered, although it may be constructed of plastic, so as to prevent possible injury or scratching the film jacket. A further advantage of the arrangement is that the film jacket holder can be moved while the objective is in its down position and the foot engaging the film jacket so as to accommodate scanning of each row and the images therein in the viewing screen.

Still another feature of the invention is the novel construction by means of which the condenser lenses are mounted so as to permit the lens elements to essentially float on their support and whereby no one of the condenser lenses is held under stress but all are nevertheless positively maintained in a predetermined alignment to which the objective is related when its foot engages on the film jacket.

Another feature of the invention is the mounting of the light source and the condenser lenses on a common support which is removably mounted on the stage which permits the entire assembly to be removed as a unit for cleaning, as through an opening in the stage, for repair, cleaning and/or other maintenance.

Still another feature of the invention is the spacing of the condensers and the light source from each other and within a mass of air permitting free circulation thereabout and so that the apex of the top condenser surface extends into the stage aperture and lies essentially in the plane of the stage surface. By such means, each film frame as it is aligned with the objective can be adequately illuminated for maximum brilliance in projection and while providing a construction which avoids the necessity for heat absorbing filters between the film jacket and the light source.

Thus a principal object of the present invention is to provide a construction of rear view projection viewer which is both simple in its assembly and which also can be operated efficiently and effectively by even an unskilled individual.

Still another object of the invention is to provide a construction of rear projection viewer capable of producing enlarged images of micro-film, which although convenient and simple to operate also provides excellent contrast and good image projection as well as being highly practical and economical to manufacture.

Many other objects, advantages and/or features of the invention will be at once apparent, or will become so, after consideration of the description of one embodiment of the invention, which will now be described in connection with the figures comprising the accompanying drawings.

Referring now to said drawings:

FIGURES 10 and 11 considered with FIGURE 7 illustrating the manner in which the condenser lenses are supported.

Figures 1, 2:
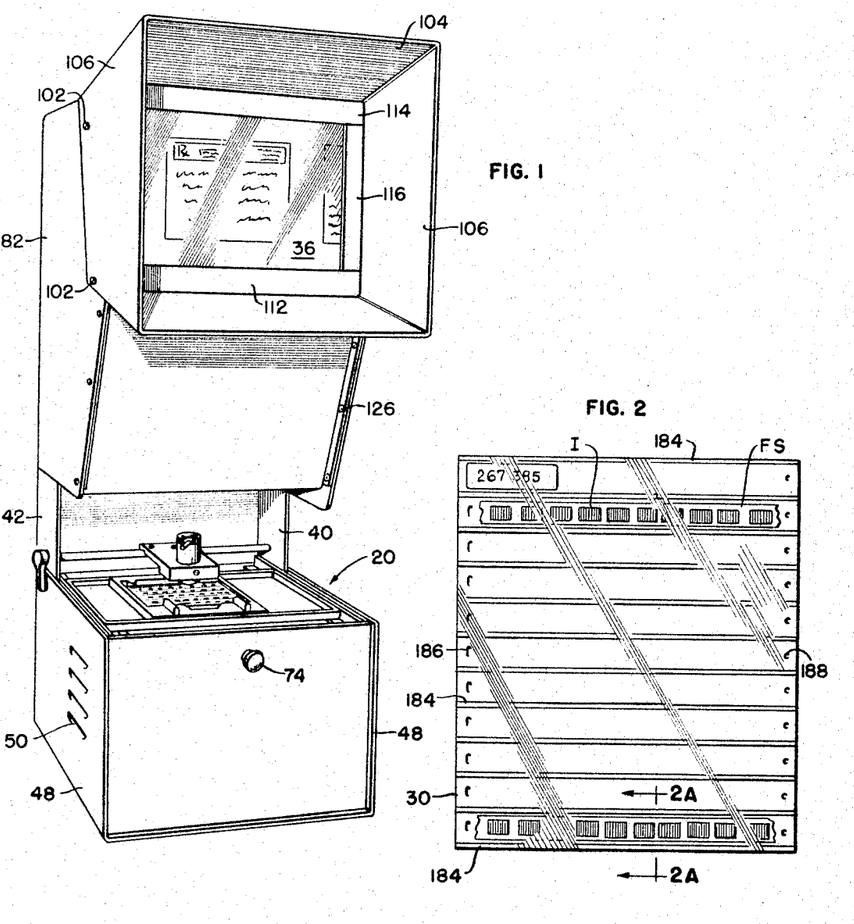
FIGURE 1 is a front perspective view illustrating one embodiment of the invention.
FIGURE 2 illustrates in plan a construction of film jacket adapted to be used with the present invention.
Figures 3, 4, 5:
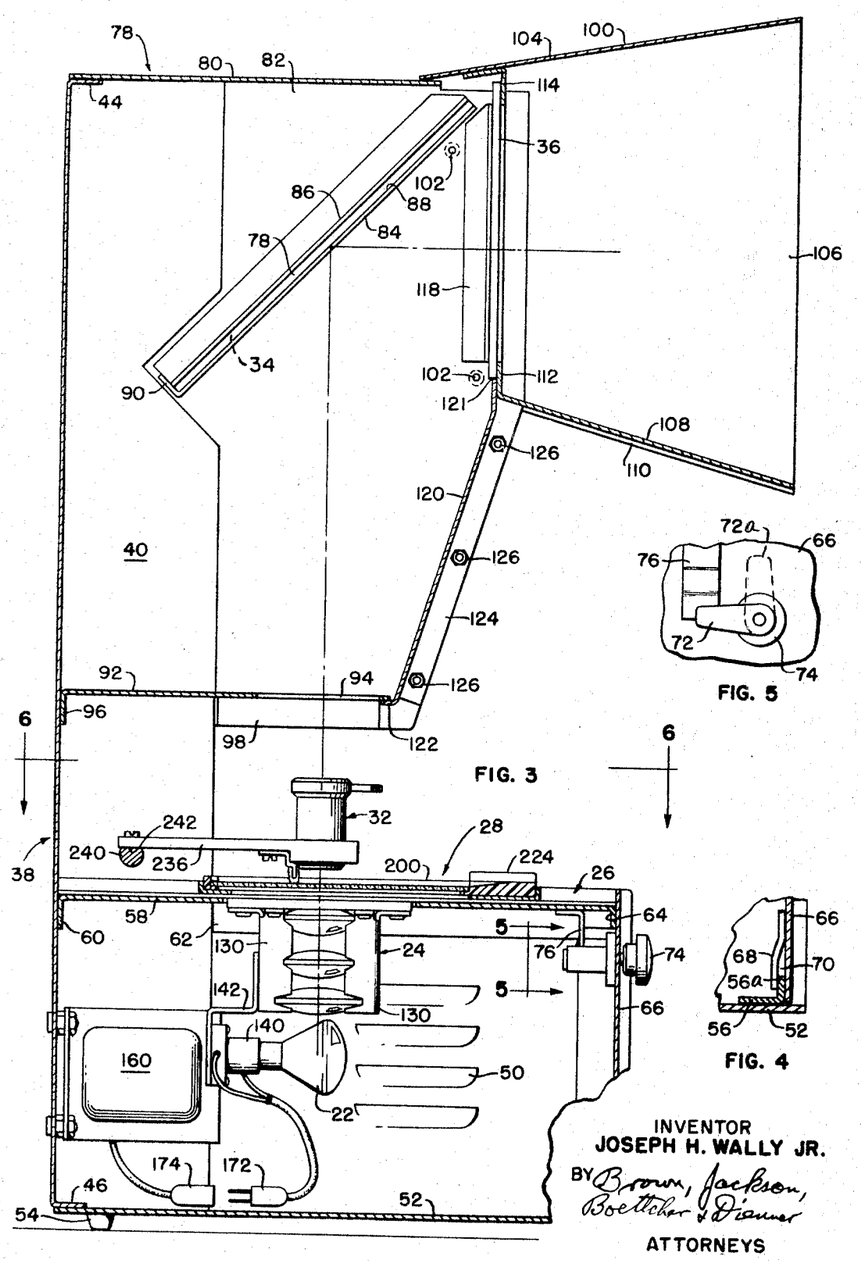
FIGURE 3 is a vertical sectional view taken through the rear projection viewer illustrated in FIGURE 1.
FIGURE 4 illustrates a detail in the construction of the front access door.
FIGURE 5 is a fragmentary side elevational view taken along lines 5—5 of FIGURE 3 looking in the direction indicated by the arrows and shows details of the latch means for said access door.

Referring now more particularly to the several views, it will be understood that therein like parts are identified by like reference numerals. FIGURE 1 taken with FIGURE 3, shows a rear projection viewer comprising a housing indicated generally at 20 containing in its base an illuminatable light source or lamp 22 and a condenser lens assembly 24 axially aligned therewith and depending from a stage 26 on which is adjustably supported a holder indicated generally at 28. Holder 28 serves to receive a jacket 30 of film strips FS, such as is illustrated in FIGURE 2, and is also adapted for compound lateral movement on stage 26 to permit selective alignment of each of the images I of its film strips between the condenser lens assembly 24 and an objective 32 supported by the housing over stage 26 and in alignment with the condenser lens assembly 24. At 34 is a front surface reflecting mirror positioned over the objective 32 and set at an angle such that light rays from the objective 32 are reflected thereby and focused in the viewing screen 36 disposed forwardly of the mirror 34. Housing 20 which provides the support for said enumerated components may be constructed in any suitable manner. However, as illustrated it comprises a main channel member constructed of sheet metal 38 which extends the full height of the projector housing and constitutes the back wall thereof. As illustrated in FIGURE 3 it has integral side flanges 40 and 42 which also extend the full height of the housing and forwardly directed top and bottom end flanges 44 and 46. Said side and end flanges constitute the means on which the remaining panels forming the housing are assembled. As shown in FIGURE 3, the condenser and light source assembly are enclosed within a first enclosure comprising a rectangular-shaped compartment or base formed by a pair of side panels 48 which are welded or otherwise permanently fastened to the lower portion of the side flanges 40 and 42 of the main channel member 38, said side panels being provided with air vents 50. The bottom of the housing is closed by a panel 52 welded at its rear edge to the underside of bottom flange 46, and which supports at its four corners pedestals 54, one of which is illustrated in FIGURE 3. Side panels 48, 48 are preferably edge welded to said bottom panels 52 along their lower edges and an angle member 54 extends across the front of said bottom wall 52, being face-welded to the bottom panel 52 and butt-welded to the lower corners of the side panels 48, 48. The top of said first enclosure or base is enclosed by a horizontally disposed panel 58, having a rear flange 60 welded to the housing rear wall 38, a pair of depending side flanges 62 welded to the inner side of the side panels 48, 48 immediately below the top edges thereof. It also has a front flange 64 which provides an abutment against which a removable access door or closure panel 66 engages to complete the enclosure of the housing base. As illustrated in FIGURE 4, member 68 is welded to closure panel 66 along its lower margin and so as to leave a recess 70 which engages about the vertical extending portion 56a of angle member 56. Closure 66 is also provided with a latch 72 (FIGURE 5) operatively secured to the inner end of a rotatable knob 74, which is conveniently accessible from outside the door 66. Latch 72 when disposed in the illustrated horizontal position lies behind stop 76 which is welded in depending relation to the underside of the top wall 58 of the housing base to secure the closure panel 66 in place. By rotating knob 74 in a clockwise direction it may be moved to the position illustrated by phantom line 72a where it allows closure panel 66 to be removed by pulling forward and lifting so as to release its catch with portion 56a. Channel supporting member 38 also supports a second enclosure spaced over said first enclosure or base comprising a sheet metal member indicated in its entirety at 78 at FIGURE 3, and which is folded into a substantially U shape such that its bight comprises the top wall 80 of the projector housing and which is welded to the top end flange 44 of said main supporting member 38. The legs of said U-shaped member 78 define the side walls 82 of said second enclosure and are welded to the side flanges 40, 42 of the main supporting member 38. Sidewalls 82 in turn have a pair of flange members 84 and 86 welded thereto, which provide a pair of inclined parallel grooves 88 into which the side edges of mirror 34 is inserted at their top, the bottom edge of the mirror seating against the upturned flange 90 of flange supporting member 84. At 92 is a further panel which closes the bottom of the second enclosure or mirror containing compartment. It has an opening 94 which is aligned with objective 32 to permit passage of light rays from objective 32 to the mirror 34. Bottom panel 92 has a rear flange 96 by which it s welded to supporting member 38 and depending side flanges 98 by which it is welded to side wall 82, thereby affording strength and rigidity as well as light-tightness to the mirror enclosing portion of the projector housing.

At 100 is a rectangular-shaped outwardly flared shield for viewing screen 36 which is secured to the front margins of side walls 82 by self threading screws 102 (FIGS. 1 and 3). As illustrated in FIGURE 3, shield 100 comprises a first sheet member folded to define a top wall 104 and opposed side walls 106, the angle of folding being selected to afford the mentioned outward flaring of said walls. The bottom wall of the shield is formed by a separate sheet panel 108, which is welded to the provided end flanges 110, 110 of the side panels 106, 106 of the viewing screen shield 102. Bottom panel 108 also has a flange 112 at its inner end which cooperates with an angle member 114 secured to the underside of the top panel 104 of said shield and inturned flanged ends of the shield walls 106 to define one side of a supporting frame for viewing screen 36. At 118 are indicated a pair of vertically extending angle members welded to the side panels 82 of the mirror housing to define with flanges 116 vertical grooves to receive the side edges of the viewing screen 36 which is inserted therebetween from beneath and is held in place by the upper edge 121 of panel 120 (FIGURE 3), which completes the enclosure of the mirror housing. Panel 120 also includes a lower lip 122 which engages beneath the forward edge of the mirrow housing bottom wall panel 92 and has side flanges 124 which are removably secured to the forward edges of the mirror housing side panels 82 as by bolts 126. Viewing screen 36 is of conventional construction and preferably comprises a transparent darkly colored sheet of glass on which an image can be focused by the objective 32 in reflection from mirror 34 for viewing therethrough.

Figure 10:
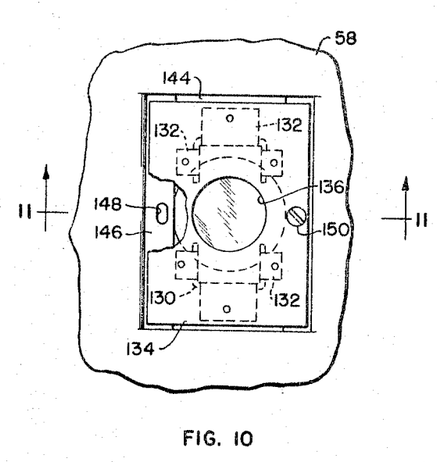
FIGURE 10 is a top plan view of the condenser lens mount assembly.
Figure 11:
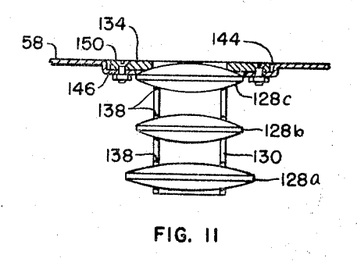
FIGURE 11 is a vertical sectional view taken thereof along lines 11—11 of FIGURE 10.

An important feature of the invention is the novel construction of the condenser lens and light source assembly which will now be described. Referring therefore to FIGURES 10 and 11 which are to be considered in connection with FIGURE 3 and also FIGURE 7, the condenser lenses are illustrated as three in number and indicated by reference numerals 128a, 128b and 128c. They are illustrtaed as of convexo-convex shape, the lower condenser lens 128a being of the largest diameter and at least their under surface is of spherical curvature. The mount for the condenser lenses comprises two pieces of light weight sheet metal stock which have been folded to define a pair of channel members 130 and cut along their two folds at their upper ends and which ends have been folded back to define three mounting flanges 132 shown best by phantom lines in FIGURE 10. Also, as illustrated in said FIGURE 10, these mounting flanges 132 are bolted or otherwise secured to the underside of relatively thick mounting plate or block 134 having a central circular shaped opening with which the condenser lenses 128a-b-c are respectively aligned. Block 134 is of Bakelite or other heat insulating plastic material. As illustrated best by FIGURES 11 and 3, the two side flanges of said channel members 130 are appropriately V-slotted as at 138 in three spaced locations which receive the peripheral edges of the condenser lenses 128a, 128b and 128c. These V-shaped notches 138 are purposely made larger than the thickness of the peripheral edge of the condenser lenses mounted therebetween therein so that they do not exert any tension on the peripheral edges of the lenses. Because the underside of the condenser lenses are of spherical curvature and the lower edge of said notches are of minimal width and have essentially point or tangential contact with the lens undersurface, the condenser lenses automatically align themselves on the seats which the bottom surfaces of said notches 138 thus constitute and with respect to each other and the central opening 136. Because the lenses are thus free to float on their seats, they are also free of stress and their undersurface being spherical there is no problem of their moving out of adjustment.

It is also a feature of the invention that the light source is mounted on the condenser lens support so that both the light source and the condenser lenses may be assembled and removed from the projector base as a unit. As illustrated in FIGURE 3, the light source represented by lamp 22 is received in a socket 140 mounted on bracket 142 which is welded to one of said channel members 130 forming the condenser lens mount. Preferably lamp 22 is of the type which establishes a spring based bayonet type connection with socket 140 so that when located in its socket its filament is accurately located on the optical axis of the condenser lenses.

Figure 12:
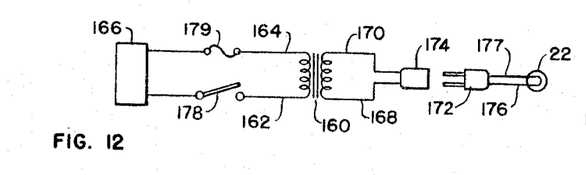
FIGURE 12 is a schematic plan of the required electrical circuit.

As illustrated in FIGURE 11, the top wall 58 of the housing base, and which constitutes the stage 26 of the projector housing is provided with an opening at 144 aligned beneath opening 96 in the overhead mirror housing enclosure. On two opposite sides of said opening are mounting flanges or seats 146 depressed below the plane of panel 58 to receive the condenser lens assembly mounting block 134. As shown in FIGURE 11, these flanges 146 are sufficiently depressed that when block 134 rests thereon its upper surface is essentially flush with the upper surface of the panel 58 which constitutes the projector stage 26 previously identified. The top condenser lens 128c is also so located that the apex of its upper convex surface is centered in aperture 136 of mounting block 134 which constitutes the aperture of stage 26 and so as to lie substantially in the plane of the stage 26. This has the advantage, as afterwards described, of locating said top surface of the condenser lens 128c as close as practical to the film while still accomodating lateral movement of the film supporting jacket holder 28 in the stage 26 as will be afterwards described. This provides the rays of the light gathered by the condenser lenses from source 22 and converged immediately below the objective for focusing thereby to screen 36 will also illuminate not only the full cross section of opening 136 but also the full area of the film frame centered by the holder between the condensed lenses and the objective 32. The mounting flanges 146 are additionally provided elongated openings 148 through which fastening bolts 150 extend to secure the condenser lens assembly 124 in place depending from stage 58. The elongation of slots 148 permits an adjustment of block 134 on said supporting flanges 146 to accurately center the optical axis of the condenser lenses and the filament of the lamp 22 with respect to the optical axis of the objective 32 when in its image focusing position as afterwards described. Referring again to FIGURE 3, at 160 is a transformer bolted to the rear wall 38 at a convenient location thereon and has one winding connecting by leads 162 and 164 (FIGURE 12) to a convenience plug 166 by which they may be connected to a suitable power source. The other winding of transformer 160 connects by leads 168, 170 to the terminals of one half 174 of a disconnect plug, the other half 172 of the disconnect plug having leads 176 and 177 from the terminals thereof which connect to the lamp housing 140. In lead 164 is a fuse 179 which is located in rear wall 38 of the housing where it is out of sight but conveniently accessible from the exterior to replace when necessary. In line 162 is an on-off switch 178 which is conveniently located in one of the side panels 48 of the base of the housing and so as to be operable from outside the projector. It will also be understood that opening 144 in panel 58 is of such a cross section as to accomodate lifting of the condenser lens assembly including lamp 22 and its mount, therethrough upon removing bolts 150 and disconnecting the two halves 172 and 174 of the electrical connector plug. This means that the source light condenser assembly can be removed as an entity for cleaning and accurately replaced by an untrained person and without disturbing the aligned relation of the lamp filament and the condenser lenses.

Furthermore, it will be recognized that the described construction affords excellent possibilities for ventilation and removal of heat generated by the energizing of lamp 22. The housing base, although relatively large, is essentially open so as to provide a large mass of air surrounding the condenser lenses and lamp 22 and which may be circulated through vents 50. It will also be noted that the condenser lenses 128a, 128b, and 128c, have been selected for nu values, thicknesses and surface curvatures such that they may be air spaced from each other and also from lamp 22 and so that there is substantially no impediment to air movement therebetween and about lamp 22 with the result that it has been found possible to obtain maximum illumination of the film image and focusing of a brilliant clear image thereof in the viewing screen 36 without the requirement of heat absorbing filters and/or a blower for moving air through the housing base.

Another novel and important feature of the invention is the construction of the holder which supports the film jacket and so as to permit selective alignment of any one of the film images in the several rows thereof while holding the projected images square with the periphery of the viewing screen.

Figure 2A:
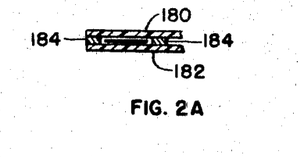
FIGURE 2a is a fragmented sectional view taken through said jacket lines 2—2 of FIGURE 2.

Referring first to FIGURE 2, as previously described, the film containing the exposed images of the Rx prescriptions is cut into strips FS of ten images or frames I each. The jacket 30 in which these film strips FS are inserted comprise two sheets of thin gauge acetate or other suitable transparent plastic 180 and 182 (FIGURE 2a) having spacers of opaque material 184 secured therebetween at spaced intervals and at the top and bottom edges thereof to define 11 rows or channels each of a width only slightly wider than the film strips which are to be inserted into said rows. Separators 184 are approximately the same thickness as the film strips although they may be slightly larger for greater convenience when inserting the film strips FS therebetween. One of the two remaining sides of the jacket is sealed by applying a hot heated iron to top sheet 180 at the end of each row sufficiently to fuse a spot of the two sheets without distorting the under surface of the bottom sheet 182. The fourth side of the jacket is left open although the margin of the top sheet 180 only may also be touched with a heated iron to provide a dimple which serves as a lock to prevent accidental removal of the film strips FS after they are assembled into place. If it is desired, the fourth side of the jacket may also be closed after the film strips have been inserted. In FIGURE 2 it will be noted that only ten of the tiers or rows are utilized to mount the film strips, the top row being left vacant to provide space for identifying legends as for example a code number.

Figure 6:
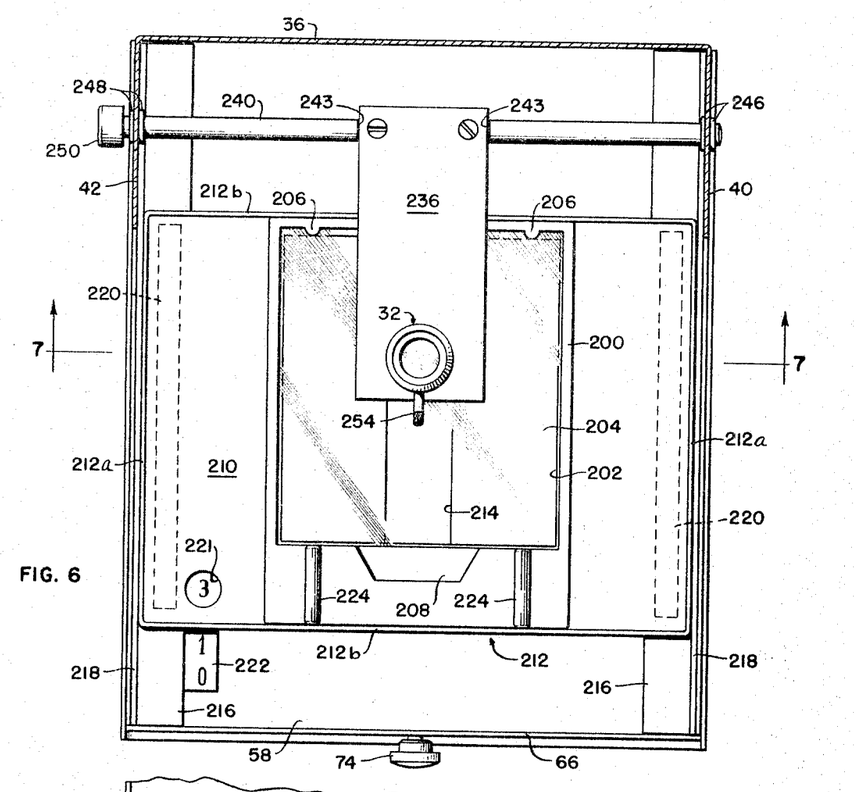
FIGURE 6 is a top plan view partly in section taken along lines 6—6 of FIGURE 3 and to illustrate details in construction of the objective mount and film jacket holder.
Figure 9:
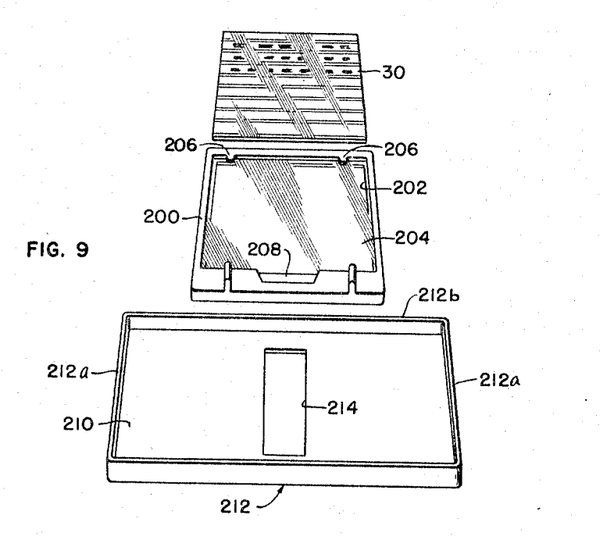
FIGURE 9 is an exploded view showing the film jacket and the two slides comprising the holder therefor.

Referring now to FIGURE 9, considered in conjunction with FIGURE 6, the film jacket holder 28 is seen to comprise two slide members, the first of which embodies a rectangular shaped frame 200 of suitable opaque plastic material having a lip 202 on which is mounted a transparent plate 204. At the rear of the frame are provided a pair of spaced stops 206 which overly the glass plate 204 and serve to hold it in place. These stops 206 also serve to locate one side of the jacket 30 which is rested on plate 204, the spacing of stops 206 from the opposite wall of frame 200 and the spacing between the other two side walls of the frame 200 corresponding substantially to the dimensions of the jacket 30 so that it will be retained against lateral movement on transparent wall 204. Frame 200 is also provided with a finger recess 208 in the forward wall thereof, which facilitates the operator reaching under the edge of the film jacket 30 to remove the same. Frame 200 has a flat underside which serves as runners slidably engaging the bottom wall of a second slide 202 on which it seats, said slide 210 having an upturned wall 212 about its rectangular shaped periphery. Centrally of the flat bottom wall of member 210 is a narrow elongated slot or light transmitting area 214 disposed parallel to the two side walls 212a comprising the frame 212 of member 210. Member 210, as shown in FIGURES 1 and 6 slidably seats on the upper surface of a pair of stainless steel slideways 216 provided at the two sides of the stage 26, said slideways 216 having vertical portions 218 against which side walls 212a of member 210 slidably engage. Member 210 is therefore free to move forward and away from the rear wall 36 of the projector housing and so as to selectively align each row of film frames of the film jacket 30 located within frame 200. Slot 214 is sufficiently long that in said adjustment of member 210 light from lamp 22 can continue to pass through opening 136 to illuminate that film frame or portion of the film jacket aligned therewith. Usefully the underside of member 210 is also provided with strips 220 (FIG. 6) of material such as Teflon (tetrafluoroethylene) which provides a nearly nil friction factor between member 210 and slideways 216 to facilitate sliding adjustment of member 210 along guides 216. Along side one of the guideways 216 and extending lengthwise thereof is a plate 222 having markings 0 through 9 which are individually visible through an aligned opening in the bottom wall of member 210 and serve to indicate the number of the tier or row of film strips of the jacket 30 which is aligned with respect to the stage aperture. Side walls 212b of member 210, on the other hand act as guides to confine the sliding adjustment of frame for movement in directions at right angles to the length of slot 214 and the direction of sliding movement of member 210. At 224 are a pair of finger grips which the operator may use in thus sliding the frame 200 along member 210. Therefore, with a jacket 30 located within frame 200, by moving member 210 until the reference numeral indicating the proper row thereof aligns with opening 224 and sliding frame 200 laterally thereof, the operator may select any one of the film images in jacket for viewing in screen 36, conveniently, simply and with a minimum of effort on his part.

As previously mentioned, it is important that the film frame containing the thus selected Rx prescription image to be projected be held flat, that is to say in a plane disposed at right angles to the optical axis of the objective. It must also be at the proper distance from the front surface of the objective. Even slight variations in the spacing of the objective from the film image will result in the magnified image viewed in screen 36 being out of focus.

Figure 7:
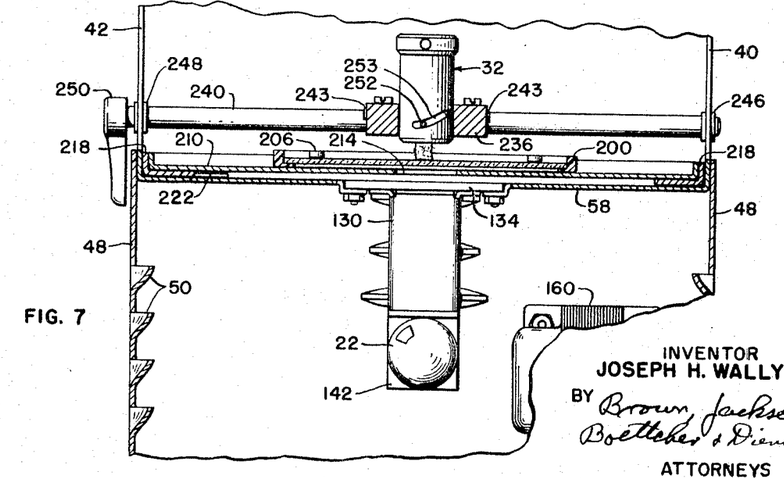
FIGURE 7 is a fragmented view showing further details in the construction of said holder, the mount for the objective and the condenser lens assembly support, the view being taken along the line 7—7 of FIGURE 6.
Figure 8:
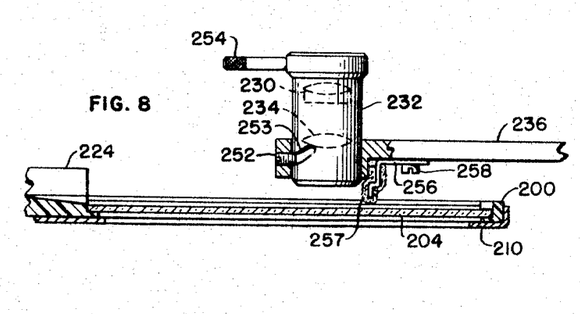
FIGURE 8 is an enlarged view taken in vertical section to show details in the construction of the foot which engages the film jacket to hold that portion on which the objective is focused flat against the holder and at the proper distance from the objective lenses.

The present invention provides for the accomplishment of both of these functions in a simple and convenient novel manner. Referring to FIGURES 7 and 8 considered in conjunction with FIGURES 1 and 3, the objective lenses 230 shown in phantom lines in FIGURE 8 are fixedly mounted within a cylindrical tube 232 which is rotatably supported within a circular shaped bore 234 in the free end of an arm 236 which is bolted at its opposite end to the flattened portion 242 (FIG. 3) of a horizontally disposed shaft 240, comprising a recess also having side walls 243 which limit side play of arm 236 on its connection to shaft 240. One end of shaft 240 is rotatably supported in a provided opening in side flange 40 of channel member 38 and held against axial displacement by connectors 246. The opposite end of shaft 240 is similarly mounted for rotation in a provided opening through flange 42 and held against axial movement by connectors 248. At 250 is an operating lever or arm connected to an extension of shaft 240 which may be operated to raise and lower objective 32 relative to the projector stage 26. At 252 is a nylon screw threaded into the end of arm 236 and which engages into a spiraling groove 252 provided in the wall of the objective housing 232. At its upper end, housing 232 is also provided with a handle 254. It will thus be seen that by grasping handle 254 the objective housing 232 may be rotated within bore 234 and because set screw 252 engages in recess 253 the housing will be moved inwardly or outwardly of the bore 234 to change the relative location of the objective 230, which may be then set by further tightening set screw 252. On the underside of arm 236 is secured a depending foot 256 as by screw 258. The lower end of foot 256 is of rigid non-yielding metal and felt covered although it may also be of a rigid non-scratching resin such as nylon and is located immediately adjacent the outer periphery of the objective housing 232. Consequently no portion thereof lies within the beam of light on which the objective lenses 230 focus. At the same time it is also so close to the frame or portion I of the film jacket which has been located beneath the objective lenses 230 and over aperture 144 for illumination by the light which the condenser lenses 128 converge in front of the objective lenses that said film portion is held essentially flat against the surface of glass plate 204 under the weight of the objective and its supporting arm 236. This will be the case even though there may be a slight tendency for the jacket 30 to otherwise buckle or lie other than flat on wall 204. Not only does foot 258 hold that part being focused by the objective on screen 36 flat and in a single plane but foot 258 also locates the front surface of the objective at a fixed distance from the film jacket 30 and so that the optical axis of the objective is at right angles to the film portion being held flat. Therefore the portion of the film aligned with the objective will always be projected in proper focus.

As previously noted, the setting of the objective lenses within bore 234 can be changed by slightly loosening set screw 252 and turning on 254. Foot 258 located outside the periphery of casing 232 does not interfere with this adjustment.

It will therefore be appreciated that either by grasping handle 250 or the end of arm 236 itself, the objective 32 may be raised away from frame 200 of the film jacket holder 28 to permit the instantaneous loading of a film jacket 30 therein and/or to remove a jacket therefrom. Both these operations can be performed conveniently and speedily in an uncomplicated manner and without disturbing the setting of the objective. When positioned within the frame 200 the jacket cannot move so that assurance is had that each film frame and its image will be correctly positioned beneath the objective so that when projected onto screen 36 the edges of the enlargement thereof as viewed in screen 36 will be properly aligned with respect to the periphery of the screen and no detail will be lost. At the same time any one of the film images on the jacket 30 may be selectively aligned with the objective for focusing at screen 36 by first moving member 210 to locate the proper row which will be indicated by the number appearing through opening 224. Then by moving frame 200 each of the images of the tier may be scanned until the required image is located beneath the objective.

Thus, the projector is convenient to operate by those having little skill and with a minimum of instruction. At the same time the viewer is also one that is easy to maintain. Access to the base of the housing may be obtained, as previously mentioned, by turning knob 74 in a clockwise direction and pulling the closure panel 66 first forwardly adjacent its top to clear the stage forming panel 58 and then lifting upwardly to disengage its catch 68 from portion 56a. Access may also be obtained to the second enclosure containing the mirror by removing bolts 126 which allows panel 120 to be removed and therefore viewing screen 36 to be dropped out of its framing support providing access to the interior of the mirror housing both through the area vacated by the screen 36 and the area vacated by the removal of panel 120. If it is desired to remove the mirror 34 as for cleaning or replacement, this may be obtained by unscrewing screws 100 which connect the viewing screen shield 102 to the main body of the projector housing after panel 120 and screen 36 have been first removed. The mirror may be then slid upwardly and out from between the pairs of flanges 84, 86, which with flange 90 define the mirror support. The condenser lens and lamp source also may be removed as a unit for cleaning and adjustment by simply unbolting block 134 from its seat on flanges 146 and then raising the unit through the opening in the top wall 58 or housing stage, having, of course, first turned off switch 178 and disconnected the two halves 172, 174 of the electrical connector. As it also noted above, the setting of the objective lenses 230 relative to the plane in which the film images are supported my be adjusted by rotating the objective housing 232 in its bore 235 by grasping handle 254, set screw 252 frictionally resisting said adjustment. Adjustment of the objective lenses is normally not required, except as the felt on the end of foot 256 wears. Foot 256 can also be easily replaced for refelting or replacing by simply removing screw 258.

As thus described it will be apparent that all of the recited objects, features and advantages of the invention have been demonstrated as obtainable in a convenient highly practical manner and in a construction which is both practical and economical to manufacture, as well as to maintain.

Thus having described my invention, I claim:

1. A projection viewer comprising, in combination, a housing including a horizontal stage, a condenser lens means and a light source removably mounted as a unit on the underside of said stage and enclosed by the housing, a holder for film jackets containing a plurality of film images, said holder being slidably disposed on said stage for compound horizontal movement to permit centering a selected one of said film images over the condenser lens assembly, an objective, means supporting said objective over said stage for movement toward and away from the holder, said supporting means including a member which engages the top surface of a jacket supported in the holder immediately outside the film image thereof which is centered over the condenser lens and beneath the objective, said member thereby holding said centered film image in a plane at right angles to the optical axis of the objective and the objective at a fixed distance from said film image, said housing supporting a reflector above the objective and a viewing screen spaced forwardly of the reflector on which an enlarged image of the centered film image is focused by the objective for viewing through the screen.

2. A projection viewer comprising, in combination, a stage having an aperture, a condenser lens assembly and a light source mounted on the underside of said stage disposed to illuminate said aperture, a first slide member mounted on said stage including a light transmitting portion aligned with said aperture, means confining said first slide member for movement in a direction paralleling the extent of said light transmitting portion, a second slide member slidably supported on said first slide member and confined for sliding movement thereon at right angles to the direction of movement of the first slide member, said second slide member including a light transmitting bottom wall on which to rest a film jacket containing a plurality of film images, and stop means which hold the film jacket against lateral displacement thereon, said movements of the slide members permitting each said film images to be selectively centered over the condenser lens assembly, an objective adjustably supported over said aperture in the stage and including means for engaging a film jacket supported on the second slide member at a location immediately outside the film image when centered over the condenser lens assembly, said means holding said aligned film image in a plane essentially at right angles to the optical axis of the objective and at a fixed distance from the objective, said viewer further including a viewing screen spaced from the objective on which an enlarged image of the centering film image is focused by the objective for viewing.

3. A projection viewer as claimed in claim 2 wherein the first slide member has an indicator and the stage has indicia with which the indicator aligns to define the adjusted position thereof relative to the aperture in the stage.

4. In a projection viewer having a horizontal stage provided with film receiving means and an objective spaced thereover, a plurality of condenser lenses supported in aligned relation with said objective and beneath said stage, the supporting means for said condenser lenses comprising a pair of facing channel members having aligned spaced notches in the sides thereof in which are received the adjacent peripheral edges of the condenser lenses, the upper portion of said channel members being secured to a centrally-apertured block held within a provided opening in the stage, the block being removably mounted to the stage and with its top surface essentially flush with the top surface of the stage, at least the under surface of the condenser lenses being of spherical curvature and the bottom edge of the notches having essentially tangential contact therewith, the condenser lenses being supported thereon without tension and being self-aligning with the aperture in the block.

5. The combination of claim 4 wherein the uppermost located one of said condenser lenses has a convex upper surface, the apex of which extends into the aperture of the block and is disposed substantially at the plane of the top surface thereof.

6. The combination of claim 4 further including a light source and mounting means therefor carried by one of said channel members, said mounting means supporting the light source below the bottom condenser lens and aligned with the optical axis of the said condenser lenses, said condenser lenses and light source being separable from the stage as a unit.

7. In a projection viewer having a horizontal stage provided with a centrally located aperture, film holding means on said stage adapted to support film in a plane immediately adjacent and parallel to the stage, an objective positioned over said aperture and above the film holding means, a plurality of convexo-convex condenser lenses supported beneath said stage in spaced relation with each other and in optical alignment with the objective, and a light source supported in spaced relation below the bottom condenser lens and optically aligned with the condenser lenses and objective, the characteristics of said condenser lenses and their arrangement being such that the convergence of the light beam thereby is above the film holding means and below the objective, the apex of the top surface of the top condenser lens being substantially in the plane of the stage and such that the full area of the film located over the stage aperture is illuminated and the film is minimally heated.

8. A rear projection viewer comprising, in combination, a housing including a horizontally disposed film support, condenser lens means supported beneath said film support, a reflector supported over said film support and a transparent viewing screen aligned with said reflector forwardly thereof, an objective, structure adjustably mounted on the housing for supporting the objective above the film support and in optical axial alignment with the condenser lens means, said structure being operable to raise the objective away from the film support to permit insertion and removal of film beneath the objective, and said structure including foot means which engage the film immediately adjacent the portion thereof beneath the objective and aligned with the condenser lens means, said foot means holding said aligned portion of the film beneath the objective essentially in a plane normal to the optical axis of the objective while locating the objective at a distance thereover for proper focusing of an enlarged image of said aligned portion of the film to the reflector and for viewing through the transparent screen.

9. A rear projection viewer comprising in combination a vertically extending channel support, a first enclosure secured to said channel support and constituting a base having a horizontal stage provided with an aperture, said first enclosure containing condenser lens means removably secured in depending relation to said stage and aligned with the aperture thereof, and a light source supported within said enclosure below said condenser lens means and aligned therewith, a second enclosure secured to said channel support in spaced overlying relation with said first enclosure and including an opening in the bottom wall thereof aligned with the aperture in the stage of the first enclosure, said second enclosure supporting a transparent viewing screen in the front wall thereof and a shield about the periphery of said screen, said enclosure supporting a reflector at an angle therein such that it receives light rays from the condenser lens means through the aperture in the stage of the first enclosure and opening in the bottom wall of the second enclosure and directs them to the viewing screen, an arm pivotally mounted on said channel support so as to be swingable on a horizontal axis disposed above said stage and behind the aperture therein, an objective supported on the free end of said arms and including a foot secured to adjacent the bottom periphery of said objective and depends therebelow, a holder for film slidably supported on said stage including a transparent bottom wall, means confining said holder for sliding movement in directions paralleling the sides of said stage to permit selective location of portions of film laid on said transparent bottom wall of the holder in aligned relation between the objective and the stage aperture, said foot engaging the film when in said holder to hold the portion thereof beneath the objective flat against said bottom wall of the holder and to support the objective at a distance from the film such as to focus an enlarged image thereof by means of the reflector onto the viewing screen so as to be viewable therethrough, the objective and said foot being raisable away from the holder by swinging said arm to permit insertion and removal of film from the holder.

10. The rear projection viewer claimed in claim 9 wherein the objective is axially adjustably supported within the free end of its supporting arm, said arm having means for frictionally holding the objective in an axially adjusted position.

11. The rear projection viewer claimed in claim 9 wherein both the first and second enclosures include removable panels for gaining access to the interior thereof, the removable panel of the upper enclosure also having its upper edge constituted as a stop on which the viewing screen rests, said viewing screen being thereby removable with the removable panel of the second enclosure to provide for cleaning said screen and access to the interior of the second enclosure through the area vacated by the screen.

12. The rear projector viewer claimed in claim 9 wherein the film holder comprises a first slide confined on said stage for sliding movement in directions toward and away from the channel support member comprising the back wall of the viewer, said first slide including a light transmitting area alinged with the stage area and which extends in a direction parallel to the sliding movement thereof, said first slide having parallel front and rear walls, and a second slide slidable on said first slide and confined by said front and rear walls thereof for movement in directions normal to the sliding movement of the first slide, said second slide comprising a frame having a transparent bottom wall on which to lay film and means for holding said film against lateral movement on said transparent bottom wall.

13. The rear projection viewer claimed in claim 9 wherein the condenser lens means comprise a plurality of axially spaced lenses supported beneath said stage in alignment with the aperture thereof by means of a pair of facing channel members each having aligned spaced notches in the sides thereof which receive the adjacent peripheral edges of the condenser lenses, the upper portion of said channel members being secured to a block containing said aperture and which is supported on depressed portions about an opening in said stage, the block being removably mounted to said portions of the stage and with its top surface essentially flush with the top surface of the stage, at least the under surface of the condenser lenses being of spherical curvature and resting on the bottom edges of the notches, the condenser lenses being supported thereon without tension and so as to be self-aligning with the aperture in the block.

14. The rear projection viewer claimed in claim 9 wherein the uppermost surface of the condenser lens means is convex and has its apex extending into the aperture of the stage and substantially at the plane of the surface of the stage.

15. The rear projection viewer claimed in claim 13 wherein the light source is mounted on means carried by one of said channel members, the light source being supported below the bottom condenser lens and aligned with the optical axis of the said condenser lenses, said condenser lenses and light source being separable from the stage as a unit.

16. The rear projection viewer claimed in claim 9 wherein the condenser lens means comprise a plurality of convexo-convex lenses supported within said first enclosure in spaced alignment relation with each other and in alignment with the stage aperture, the light source being spaced below the bottom one of the lenses of said condenser lens means, the light source and the lenses being surrounded by a large mass of air and so as to obtain free circulation of air between the lenses and about the light source, the condenser lens means converging the light rays at a location above the film holder and below the first surface of the objective, the top surface of the top lens of the condenser lens means extending into the stage aperture and its apex being at the plane of the stage such that the full area of the film portion located by the film holder over said aperture will be illuminated by the converging beam of light so that an image of maximum brilliance is focused by the objective on the viewing screen and the film itself is minimally heated.

17. A rear projection viewer comprising, in combination, a housing including a horizontally disposed film support, condenser lens means supported beneath said film support, a reflector supported over said film support and a transparent viewing screen aligned with said reflector forwardly thereof, an objective, an arm for supporting said objective in aligned relation over the film support and condenser lens means, said arm being mounted on the housing to swing about a horizontal axis behind the film support, the objective being raiseable on said arm away from the film support to permit insertion and removal of film beneath the objective, and a foot mounted on said arm adjacent the objective to engage film held in said support, said foot when engaging the film holding the portion of the film beneath the objective essentially in a plane normal to the optical axis of the objective while locating the objective at a distance thereover for proper focusing of an enlarged image of said film portion to the reflector and for viewing through the transparent screen.

References Cited by the Examiner

UNITED STATES PATENTS

| 2,256,178 | 9/1941 | Stuart | 88—24 |
| 2,369,248 | 2/1945 | Pratt | 88—24 |
| 3,224,326 | 12/1965 | Brownscombe | 88—24 |

NORTON ANSHER, *Primary Examiner.*

F. L. BRAUN, *Assistant Examiner.*